United States Patent [19]

Miller

[11] 3,771,015

[45] Nov. 6, 1973

[54] LIGHT-EMITTING DIODE DISPLAY

[75] Inventor: Christopher F. Miller, Diamond Bar, Calif.

[73] Assignee: Beckman Instruments, Inc., Fullerton, Calif.

[22] Filed: Feb. 9, 1972

[21] Appl. No.: 224,795

[52] U.S. Cl. .......................... 315/169 R, 315/169 TV
[51] Int. Cl. .......................... H05b 37/00
[58] Field of Search .................... 315/169 R, 169 TV

[56] References Cited

UNITED STATES PATENTS

| | | | |
|---|---|---|---|
| 3,328,790 | 6/1967 | Rhodes | 315/169 R |
| 3,351,928 | 11/1967 | Smola | 315/169 R |
| 3,440,637 | 4/1969 | Molnar et al. | 315/169 R |

*Primary Examiner*—John Kominski
*Attorney*—James M. Thomson et al.

[57] ABSTRACT

A visual display adapted to show an analog presentation which represents the value of a measured parameter, in response to coded digital electrical input signals that are proportional to the parameter. In one embodiment a column of energizable light elements is provided, along with logic circuit means for selecting and energizing a series of groups of elements of the column to form a visual display which represents a numerical value between 0 and 50. In another embodiment the logic circuit is utilized to control, sequentially, three light columns, each having a different scale value.

6 Claims, 4 Drawing Figures

PATENTED NOV 6 1973 3,771,015

SHEET 2 OF 3

DECODER TRUTH TABLE

1 = TRUE
0 = FALSE
X = EITHER

| INPUT SIGNALS | | | | | OUTPUT SIGNALS | | | | | | | |
|---|---|---|---|---|---|---|---|---|---|---|---|---|
| ENA | ALL | I1 | I2 | I4 | D1 | D2 | D3 | D4 | D5 | D6 | D7 | D8 |
| 0 | X | X | X | X | 0 | 0 | 0 | 0 | 0 | 0 | 0 | 0 |
| 1 | 0 | 0 | 0 | 0 | 1 | 0 | 0 | 0 | 0 | 0 | 0 | 0 |
| 1 | 0 | 1 | 0 | 0 | 1 | 1 | 0 | 0 | 0 | 0 | 0 | 0 |
| 1 | 0 | 0 | 1 | 0 | 1 | 1 | 1 | 0 | 0 | 0 | 0 | 0 |
| 1 | 0 | 1 | 1 | 0 | 1 | 1 | 1 | 1 | 0 | 0 | 0 | 0 |
| 1 | 0 | 0 | 0 | 1 | 1 | 1 | 1 | 1 | 1 | 0 | 0 | 0 |
| 1 | 0 | 1 | 0 | 1 | 1 | 1 | 1 | 1 | 1 | 1 | 0 | 0 |
| 1 | 0 | 0 | 1 | 1 | 1 | 1 | 1 | 1 | 1 | 1 | 1 | 0 |
| 1 | 0 | 1 | 1 | 1 | 1 | 1 | 1 | 1 | 1 | 1 | 1 | 1 |
| 1 | 1 | X | X | X | 1 | 1 | 1 | 1 | 1 | 1 | 1 | 1 |

LIGHT-EMITTING DIODE DISPLAY

BACKGROUND OF THE INVENTION

The present invention relates to visual displays. More particularly the invention concerns lighted displays capable of responding to coded digital electrical input signals and presenting a visual analog display in response thereto. The lighted display described herein is especially suitable for use with process control instrumentation equipment.

Electrical instruments of various types are widely utilized in process control systems to permit operator verification of system parameters, and to permanently record the parameters of system operation.

Many problems are encountered in using conventional D'Arsonval type electrical instruments in such systems. In particular D'Arsonval type electrical meters are subject to scale nonlinearity, overshoot and pointer hangup. All of these effects become more pronounced when the instruments are used for appreciable lengths of time in systems which are exposed to mechanical vibration. In addition D'Arsonval type meters are not desirable for use in systems of the type described since they may have a response speed lower than that desired. Furthermore the electrical meters provide a type of display which may not be easily visible, and which does not lend itself to analog or graphic presentation of the parameter being monitored.

SUMMARY OF THE INVENTION

Therefore it is a general purpose of this invention to provide a lighted display adapted to present a visual presentation which represents the value of a measured parameter of a system, in response to coded digital electrical input signals that are proportional to the measured parameter. It is also the purpose of this invention to provide a display which is not subject to the problems encountered with conventional D'Arsonval type electrical instruments, and to provide a display which is extremely reliable.

The display of the invention includes a plurality of selectively energizable light elements which can be arranged in a convenient, predetermined order such as a column or row, to create a bar graph or column display which, when energized, progressively represents the analog value of a changing measured parameter. Preferably a sufficient number of light elements is provided to create the visual effect of a continuous line, with each light element representing a value of sufficiently small increment so that a display having the desired accuracy is formed.

It is envisioned that the light elements be divided into predetermined groups of multiple elements to facilitate the control thereof. A decoder circuit is associated with each group of light elements to selectively connect the elements of the corresponding group to a driver circuit whereby the selected light elements are energized. Major logic circuit means are also provided to selectively connect entire groups of light elements to the driver circuit whereby a series of groups of elements can be lighted selectively.

The logic circuit of the invention is adapted to be responsive to coded digital electrical input signals. Accordingly a code sequence circuit is provided between the line input and the logic circuit means to receive the serial coded input signals and to provide such signals to the major logic circuit and the decoder circuits.

In an alternative arrangement the logic circuits of the invention can be utilized to operate, sequentially, two or more arrangements of light elements, each of which can provide an output representation of a different scale value or format.

BRIEF DESCRIPTION OF THE DRAWING

These and other features and advantages of the invention will become more apparent when the detailed description of the invention is considered with the accompanying drawings wherein.

Figure 1:
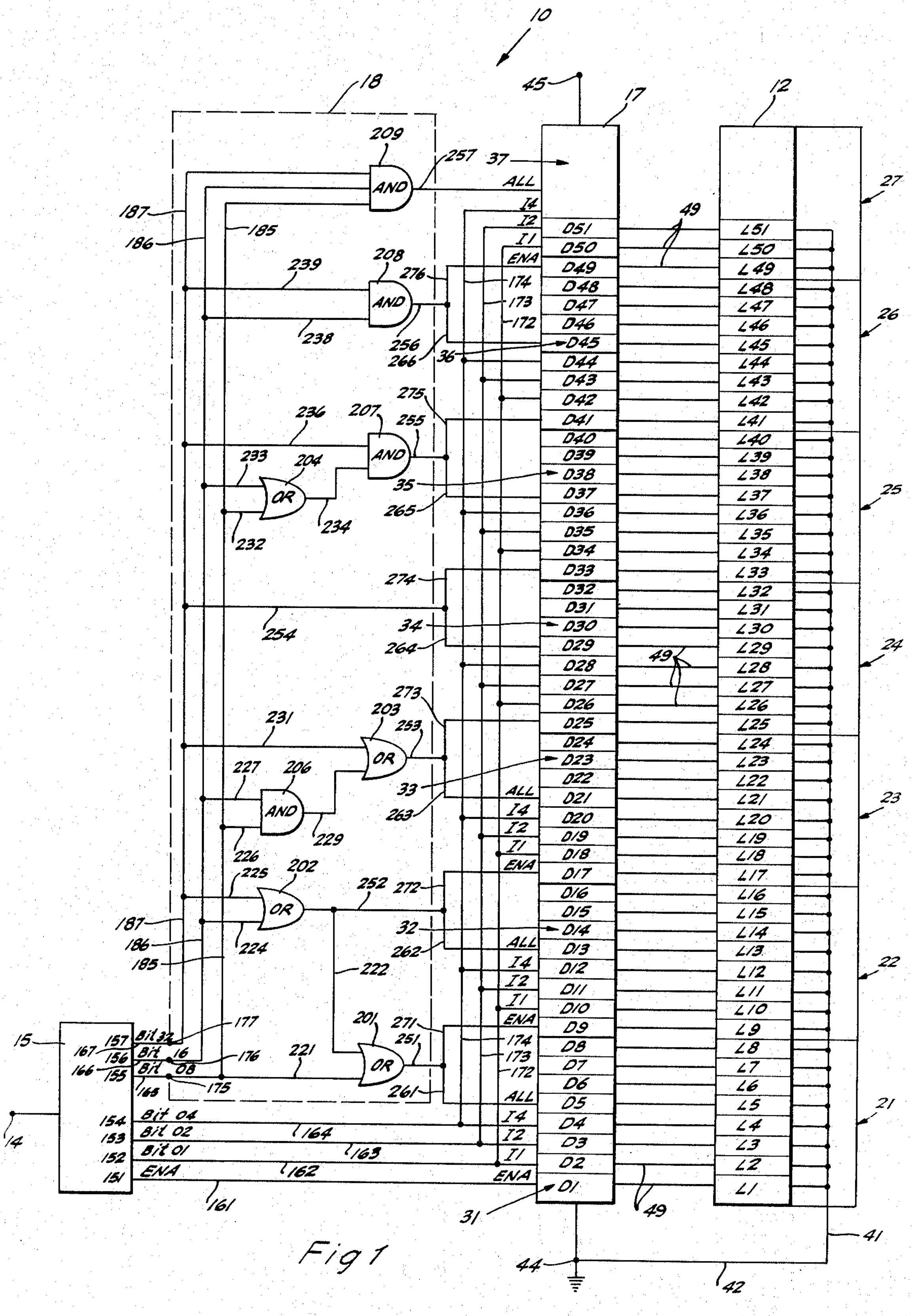
FIG. 1 is a schematic diagram of one preferred embodiment of the invention.

Referring now to the drawings and particularly to FIG. 1, one embodiment of a light display system 10 is illustrated comprising a light bar 12 adapted to present an analog visual display which represents the value of a measured parameter, as indicated by a coded digital electrical input signal received upon an input terminal 14 of a code sequencer 15 from a remote source. Selective energization of the light bar is provided by switching elements of a decoder driver circuit 17 and a major logic circuit 18, each of which are adapted to receive electrical signals from the code sequencer.

In the embodiment illustrated the light bar comprises a plurality of light elements L1–L51 arranged in a column and subdivided into seven groups 21–27. Groups 21–26 each comprise eight light elements and group 27 comprises three light elements. Accordingly the light bar is adapted for the display of numerical indicia ranging between 0 and 50. In the embodiment illustrated the light elements comprise light emitting diodes. The diodes are of conventional design and are two terminal devices adapted to emit light when current flow through the devices exceeds a predetermined threshold value. One terminal of each light element is connected to a common conductor 41 and the other terminal of each element is connected to a corresponding one of the output terminals of the decoder driver circuit. A conductor 42 is connected between conductor 41 and a grounded terminal 44 of the decoder driver circuit. Decoder driver circuit 17 is also provided with an input terminal 45 adapted to receive power from a suitable source, not illustrated, which provides energizing power for the system.

Light elements L1–L51 can be arranged in any convenient geometric form. In the embodiment illustrated they are aligned in a columnar format. The light diodes utilized preferably are provided with magnifying lenses and can be suitably mounted upon a backing strip.

Decoder driver circuit 17 includes seven decoder driver arrays 31–37 which correspond, respectively, to light element groups 21–27. Accordingly, decoder driver arrays 31–36 are each provided with eight driver elements and decoder driver array 37 is provided with three driver elements. Thus, circuit 17 includes driver elements D1-D51 which correspond to light elements L1–L51 with the output terminal of each driver element being connected to the input terminal of a corresponding light element by one of multiple conductors 49.

Each decoder driver array is provided with five input terminals, including an enable input ENA, code inputs I1, I2, and I4, and a major control input ALL.

Figure 2:
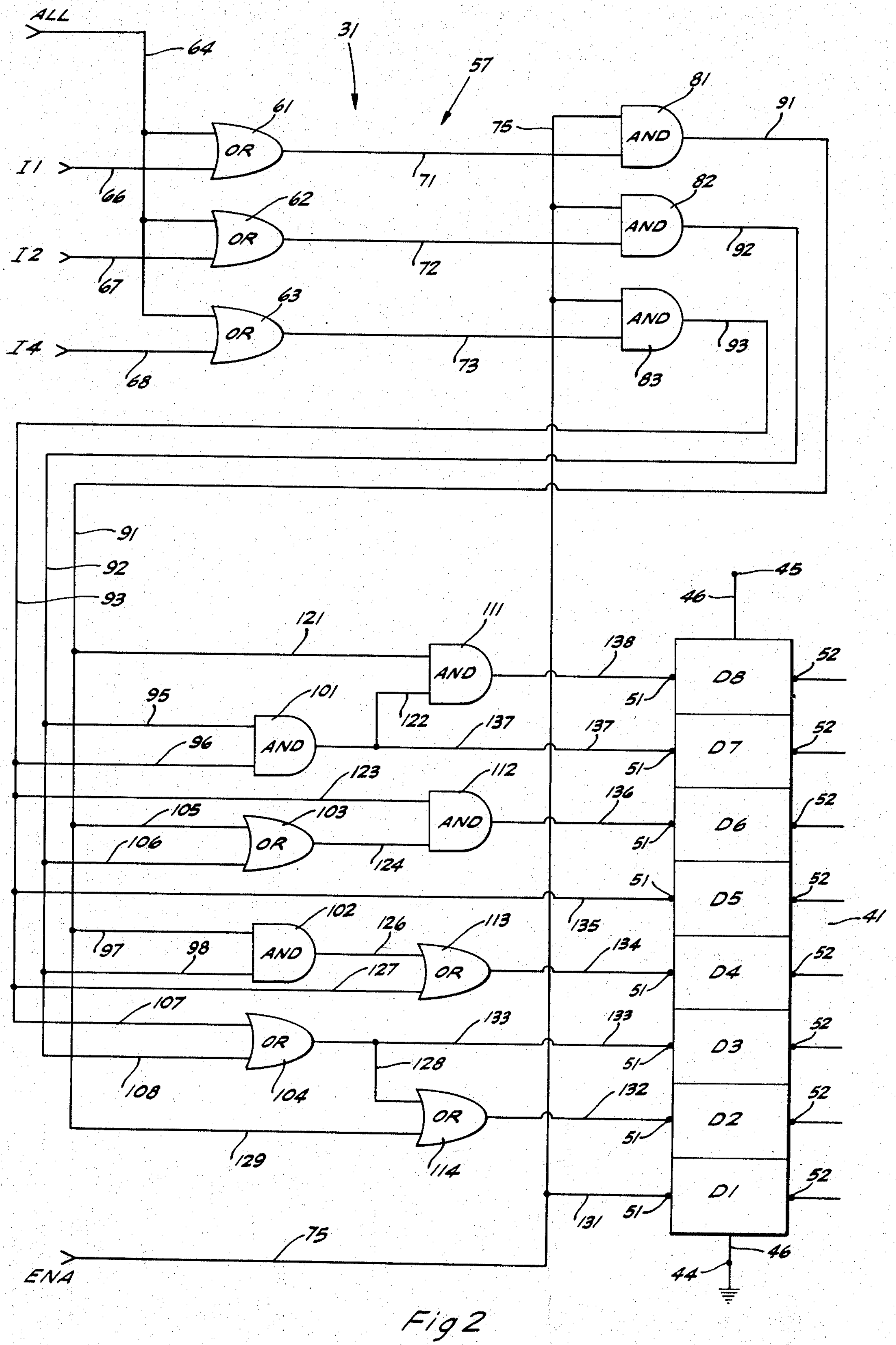
FIG. 2 is a schematic diagram of a decoder logic circuit utilized in the embodiment of FIG. 1.
Figures 3, 4:
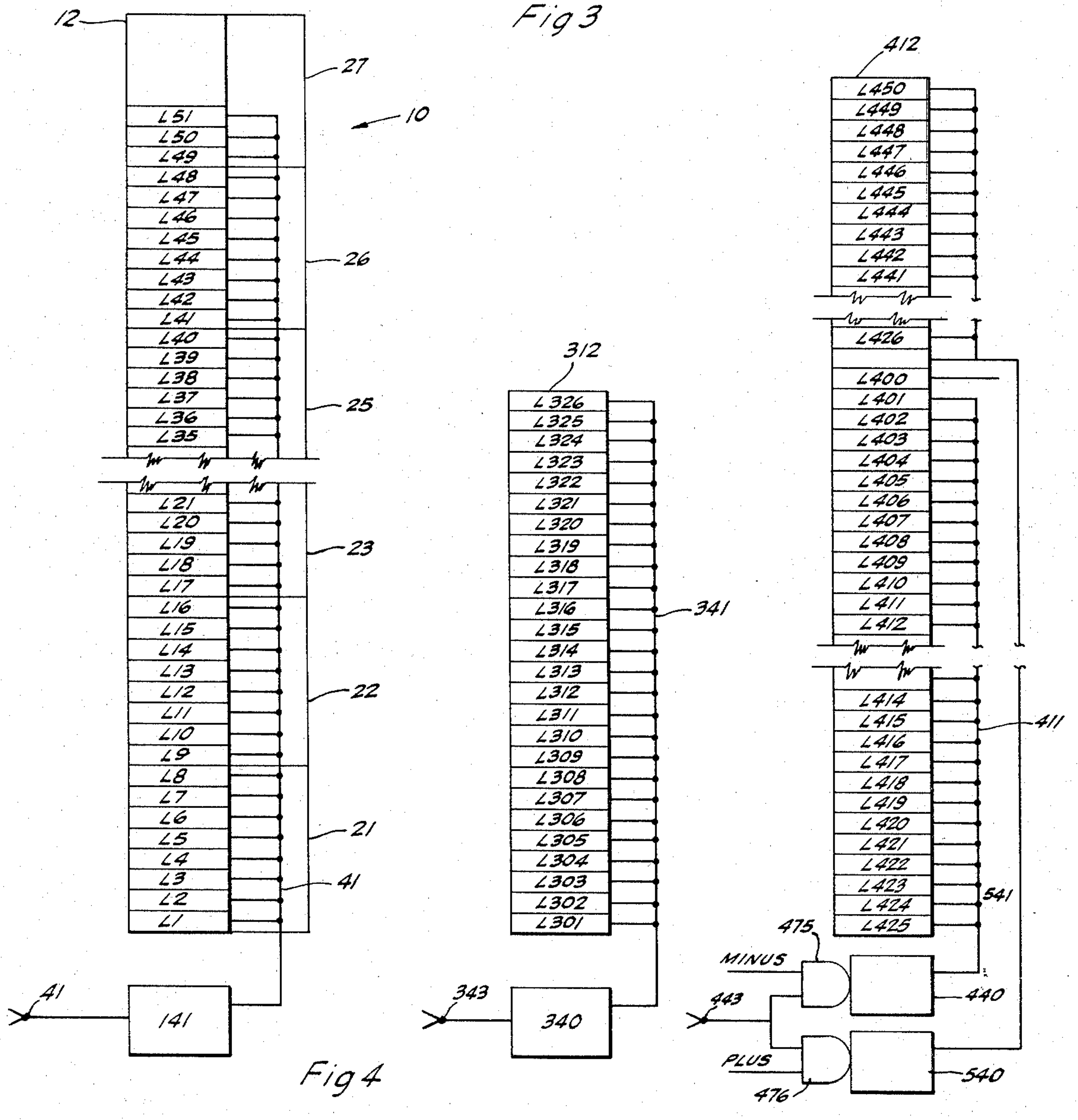
FIG. 3 is a truth table for the decoder logic circuit illustrated in FIG. 2.
FIG. 4 is a partial schematic diagram illustrating an alternative embodiment of the invention wherein three arrays of light elements are operated in sequence by logic circuitry similar to that employed in FIG. 1.

Referring now to FIGS. 2 and 3, decoder driver array 31 will be particularly described, it being understood that the other decoder driver arrays are identical thereto. Decoder driver array 31 includes a plurality of driver elements D1–D8, which are commonly connected to a conductor 46 that is connected at one end to input terminal 45 and at its other end to grounded terminal 44. Each driver element comprises a solid state switch of conventional design, adapted to provide an output signal on an output terminal 52 when the switch is biased to a conductive state by a suitable input signal applied to its input terminal 51. In the absence of a suitable input signal each driver element is normally nonconductive whereby no electrical output is present on its output terminal 52.

The electrical inputs to the driver elements are selectively controlled by a decoder generally indicated at 57. Decoder 57 includes three identical OR gates 61–63, each of which has one input connected to an ALL terminal via a conductor 64. The other input terminal of OR gate 61 is connected to input terminal I1 by a conductor 66. In similar fashion the other terminal of gate 62 is connected to input terminal I2 by a conductor 67 and the other terminal of gate 63 is connected to input terminal I4 by conductor 68. The output terminals of gates 61–63 are connected, respectively, by conductors 71–73 to one input terminal of corresponding AND gates 81–83. The other input terminal of each of gates 81–83 is connected by a conductor 75 to the enable input terminal ENA. The outputs of AND gates 81–83 are connected, respectively, to conductors 91–93.

Referring now to the lower portion of FIG. 2, an AND gate 101 is provided having one input terminal connected to conductor 92 by a conductor 95 and having its other input terminal connected to conductor 93 by conductor 96. Another AND gate 102 is provided having one input terminal connected to line 91 by a conductor 97 and another input terminal connected to conductor 92 by conductor 98.

In similar fashion OR gates 103, 104 are provided, with gate 103 having one input terminal connected to conductor 91 by a conductor 105 and having its other input terminal connected to conductor 92 by a conductor 106. Gate 104 has one input terminal connected to conductor 93 by a conductor 107 and its other input terminal connected to conductor 92 by conductor 108.

In addition, AND gates 111, 112 are provided. Gate 111 has one input terminal connected to conductor 91 by a conductor 121 and its other input terminal connected by a conductor 122 to a conductor 137 which is in turn connected to the output terminal of gate 101. Gate 112 has one input terminal connected to conductor 93 by a conductor 123 and its other input terminal connected to the output terminal of gate 103 by a conductor 124.

OR gates 113, 114 are also provided. Gate 113 has one input terminal connected to the output terminal of AND gate 102 by a conductor 126, and has its other input terminal connected to conductor 93 by a conductor 127. OR gate 114 has one input terminal connected by a conductor 128 to a conductor 133 which is connected to the output terminal of gate 104, and has its other input terminal connected to conductor 91 by a conductor 129.

The input terminal of driver D1 is connected by a conductor 131 to conductor 75 and ultimately to the ENA input terminal of the decoder driver circuit. The output terminal of gate 114 is connected to the input of driver D2 by conductor 132 and the output terminal of gate 104 is connected to the input of driver D3 by conductor 133.

The output terminal of gate 113 is connected to the input of driver D4 by a conductor 134 and conductor 93 is connected to the input terminal of driver D5 by a conductor 135. The output terminal of gate 112 is connected to the input terminal of driver D6 by a conductor 136 and the output terminal of gate 101 is connected to the input terminal of driver D7 by conductor 137. The output terminal of gate 111 is connected to driver D8 input terminal by conductor 138.

Referring now to FIG. 3, the operation of decoder driver array 31 will be explained in conjunction with the truth table illustrated in FIG. 3. The truth table shows the instantaneous output signals which appear at the output terminals of drivers D1-D8 in response to various combinations of input signals on the input terminals of the decoder array. The designation 1 corresponds to a true signal, the designation 0 corresponds to a false signal, and the designation X corresponding to either a true or a false signal. Referring to line 1 of the truth table, it should be apparent that false outputs will occur upon all of the driver input terminals in the absence of a true enable input signal ENA. Thus in the absence of a true input signal on line 75, AND gates 81–83 are all blocked and therefore have false outputs. If a true enable input ENA is present, then one or more of gates 81–83 may provide true outputs in accordance with the states of their other input terminals.

Referring particularly to line 2 of the truth table the presence of a true ENA input signal and false signals on the other inputs will result in a true signal to driver D1 and false signals to all the other drivers. This is apparent since the enable signal reaches driver D1 via conductors 75, 131 and gates 81–83 which control the other drivers all have false outputs. In the presence of a true ENA signal, a true I1 input signal will produce a true output on gate 61 and a true output from gate 81. This results in a true output from gate 114 to driver D2, which actuates driver D2. All other drivers remain unactuated. In similar fashion, true ENA and I2 inputs result in true outputs from gates 62, 82, 104 and 114 whereby drivers D1–D3 are actuated and the other drivers are unactuated.

Proceeding to the next line of the truth table, the presence of true ENA, I1 and I2 inputs will result in true outputs on gates 61, 62, 81, 82, 102, 104 and 113, 114 whereby drivers D1–D4 are actuated and drivers D5–D8 are provided with false inputs. It should be apparent then that input terminals I1, I2, I4 represent the $2^0$, $2^1$, and $2^2$ digit positions of a binary input code and, therefore, can be utilized to produce outputs from the decoder driver array which represent the numerals 1, 2, 8, selectively. In addition the presence of true ENA and ALL inputs will result in true outputs on gates 61–63 and 81–83. This causes true inputs to be provided to each of drivers D1–D8, without regard to the status of inputs I1, I2 and I4. Consequently the ALL signal acts as a major logic signal to actuate all the drivers in the decoder driver array for a function explained hereinafter.

Referring now to the lower lefthand portion of FIG. 1, code sequencer 15 is illustrated having input terminal 14 and seven output terminals 151–157. The code sequencer is a conventional unit adapted to receive coded digital signals in a 6 bit code format and to distribute the bit signals corresponding to the various digit positions of the code on terminals 152–157 respectively, with the least significant bit appearing on terminal 152 and the most significant bit appearing on terminal 157, as indicated. In addition the code sequencer provides an enable signal ENA on terminal 151 as an indication that a coded input signal has been received and distributed. A conductor 161 connects terminal 151 with the ENA input of decoder driver array 31. In addition, conductors 162–164 connect terminals 152–154, respectively, with common conductors 172–174. Conductor 172 is electrically connected to the I1 input terminal of each decoder driver array of circuit 17. In similar fashion conductor 173 is connected to the I2 input terminal of each decoder driver array and conductor 174 is connected to the I4 input terminal of each decoder driver array.

Conductors 165–167 are connected, respectively, between terminals 155–157 and terminals 175–177 which comprise input terminals to major logic circuit 18. Terminals 175–177 are connected, internally of the major logic circuit, to common conductors 185–187.

Major logic circuit 18 includes an OR gate 201 having one input terminal connected to conductor 185 by a conductor 221, and having its other input terminal connected by a conductor 222 to a conductor 252 which is in turn connected to the output terminal of an OR gate 202. The output of gate 201 is connected to a conductor 251. Gate 202 has one input terminal connected to conductor 186 by a conductor 224 and another input terminal connected to conductor 187 by a conductor 225. An aND gate 206 is provided having one input terminal connected to conductor 185 by a conductor 226 and another input terminal connected to conductor 186 by a conductor 227. The output terminal of gate 206 is connected by a conductor 229 to one input terminal of an OR gate 203, having its other input terminal connected to conductor 187 by a conductor 231 and having its output terminal connected to a conductor 253.

An OR gate 204 is also provided having one input terminal connected to conductor 185 by a conductor 232 and having another input terminal connected to conductor 186 by a conductor 233. The output terminal of gate 204 is connected by a conductor 234 to one input termina of an AND gate 207. The other input terminal of gate 207 is connected to conductor 187 by a conductor 236 and the output terminal of gate 207 is connected to a conductor 255. An aND gate 208 is provided having one input terminal connected to conductor 186 by a conductor 238 and having another input terminal connected to conductor 187 by a conductor 239. The output terminal of gate 208 is connected to a conductor 256. Finally, a three input AND gate 209 is provided having its input terminals connected, respectively, to conductors 185–187. The output terminal of gate 209 is connected to a conductor 257. On the output side of the major logic circuit, conductor 251 is connected to the ALL input terminal of decoder driver array 31 by a conductor 261 and to the ENA input terminal of decoder driver 32 by a conductor 271. In similar fashion, conductor 252 is connected to the ALL input of array 32 by a conductor 262 and to the ENA input of array 33 by conductor 272; conductor 253 is connected to the ALL input of array 33 by conductor 263 and to the ENA input of array 34 by conductor 273. Conductor 254 is connected to the ALL input of array 34 by a conductor 264 and to the ENA input of array 35 by conductor 274. Conductor 255 is connected to the ALL input of array 35 by conductor 265 and to the ENA input of array 36 by conductor 275. Finally, conductor 256 is connected to the ALL input of array 36 by conductor 266, and to the ENA input of array 37 by a conductor 276; and conductor 257 is connected to the ALL input of array 37.

The operation of the embodiment illustrated in FIG. 1 can now be explained, it being understood that the least significant bits of the input code, i.e., bit 01, bit 02 and bit 04 are utilized to control the illumination of light elements within each of the light groups 21–27. In addition the most significant bits of the input code, i.e., bit 08, bit 16, and bit 32 are utilized to control the energization of entire groups of light elements 21–27. To this extent, the major logic circuit output signals override the decoder driver signal produced in response to the least significant bits of the input signal.

For example, upon reception of the binary number 0, the code sequencer will provide only a true ENA output, which will ultimately energize light element L1. False outputs will be provided on all other output terminals of the code sequencer to ultimately prevent energization of any of the other light elements. Thus an output presentation is produced which represents the value 0.

On the other hand, reception of a binary code representing any of the numerals 1–7 will produce a true ENA signal, and corresponding true signals on one or more of the I1, I2, and I4 inputs to array 31. Consequently one or more of light elements L2–L8 will be illuminated to represent the appropriate numerical output. In the event that a coded signal is received representing numerical values between 8 and 15, a true ENA output and a true output at terminal 155 of the code sequencer will appear. These true outputs will result in a true output upon gate 201, and true inputs to the ALL input of array 31 and the ENA input of array 32. Consequently light elements L1–L8 of group 21 will be illuminated and, in addition, one or more light elements of group 22 will be illuminated to represent the appropriate numerical value.

In similar fashion, the appearance of a code representing a numerical value between 16 and 31 will provide true outputs on terminals 155, 156 which result in true outputs from gates 201, 202, 206 and 203. Consequently true ALL inputs are provided to each of arrays 31, 32, 33 and a true ENA input is provided to array 34 whereby the appropriate numerals between 16 and 31 will be displayed on the light bar. Proceeding further, the reception of coded signals corresponding to numerals ranging between 32 and 50 will produce an appropriate combination of true outputs on terminals 155–157 to enable arrays 35, 36 and/or 37 whereby the appropriate numerical values are represented on the light bar.

It should be apparent that the embodiment of FIG. 1 provides an extremely reliable system for providing an analog display of a numerical value which has been measured by a remote device and provided to the display in the form of a binary coded input signal. Although the light bar is described as comprising a column of light diodes, it should be apparent that other arrangements of light elements could be utilized, and that other types of light elements such as incandescent lights or liquid crystals could be utilized as well. Furthermore, although the embodiment of FIG. 1 has been described in conjunction with a six digit binary code, it should be apparent that other binary codes could be utilized, with appropriate modifications in the logic circuits, without departing from the scope of the invention.

Referring now to FIG. 4, an alternative embodiment of the invention is illustrated wherein three light bars are provided, adapted to be operated in sequence by a single arrangement of logic and decoding circuitry similar to that employed in the FIG. 1 embodiment. In FIG. 4, like elements of FIG. 1 are designated by like numerals. Thus a light bar 12 is illustrated comprising light elements L1–L51 which are energized in response to signals from decoder and logic circuits 17, 18 in the manner previously described. Light bar 12 differs from that of FIG. 1 only in that common conductor 41 is connected to the output terminal of a common driver circuit 141 which is adapted to receive an input signal on terminal 143 from output terminal 151 of the code sequencer. This input signal serves as both the enable signal of the decoder driver circuit and the sequence signal to the common driver which determines when light bar 12 is active and when it is inactive. Another light bar 312 is provided having light elements L301–L326 which have terminals connected to a common conductor 341 and adapted to receive energization from a common driver 340 in response to a sequence input signal from the code sequencer on terminal 343. The elements of light bar 312 are connected to alternate ones of the driver elements D1–D51 whereby output increments representing 4% of a linear scale are possible. Thus a numerical input of 25 will light element L313. Yet another light bar 412 is provided having 25 light elements on each side of a center or zero position, which permits this light bar to be used as a null meter. For example, if the input is +5 then light elements L400 and L426–435 will be illuminated. On the other hand if the input is −5 then lights L400–L411 will be illuminated.

The selection of either negative or positive displays on bar 412 is controlled by −AND gate 475 and +AND gate 476, each of which are adapted to receive one input signal on sequence terminal 443 and another input signal from the minus or plus line, respectively. The minus and plus lines are connected, by means not shown, to appropriate logic in the code sequencer whereby the polarity of the input signal can be represented in response to a clock pulse.

It should be apparent that the invention described herein provides an improved analog display which is reliable and which is easily readable. In addition the display is not subject to the problems encountered in the use of conventional electrical meters. The use of a major logic circuit providing output signals which illuminate entire groups of light elements, without regard to the output signals supplied by the individual decoder driver arrays results in a circuit having high reliability. Moreover the display can be produced in an extremely short time without excessive logic circuitry.

We claim:

1. A display system comprising a plurality of light elements arranged in groups,
switching means for selectively connecting any of said light elements to an energizing source,
control logic circuit means connected to said switching means to selective actuate said switching means for energizing predetermined ones of said light elements in response to digital coded signals including most significant and least significant bits,
said control logic means including a plurality of decoder logic arrays, each connected to the switching means controlling a corresponding group of light elements, responsive, when enabled, to said least significant bits to actuate said switch means for selectively energizing said light elements within said corresponding group, and
said control logic circuit means further including major logic circuit means, connected to said decoder logic circuits, responsive to the most significant bits of said coded signal to selectively enable one or more of said decoder logic circuits, said major control logic circuit means also providing control signals to said decoder logic circuits for energizing a series of groups of light elements in response to said most significant bits whereby the visual representation of the display comprises the composite of a series of energized groups of light elements and a number of energized light elements of a group not within said series.

2. The display system of claim 1 wherein said light elements comprise light emitting diodes.

3. The display system of claim 2 wherein each of said groups includes up to eight light elements.

4. The display system of claim 2 wherein said groups of light elements comprise two or more light bars, each of said light bars connected to said switching means for sequential operation in response to said coded digital signal.

5. The display system of cliam 4 wherein one of said light bars is adapted to display positive and negative values.

6. A display system comprising a plurality of light elements arranged in at least two groups,
switching means for selectively connecting any of said light elements to an energizing source,
control logic circuit means connected to said switching means to selectively actuate said switching means for energizing predetermined ones of said light elements in response to digital coded signals including at least one most significant and one least significant bit,
said control logic circuit means including at least two decoder logic circuits, each logic circuit connected to the switching means controlling a corresponding group of like elements, responsive when enabled to said least significant bit to actuate said switch means for selectively energizing the light elements within the corresponding group, and
said control logic circuit means further including a major logic circuit means, connected to each of said decoder logic circuits, responsive to the most significant bit of said coded signal to selectively enable said decoder logic circuits, said major control logic circuit means also providing a control signal to each of said decoder logic circuits for overriding the output states of said decoder logic circuits established by the least significant bit and energizing a series of groups of elements in response to the most significant bit, whereby the visual representation of sai display is the composite of said series of energized groups and a plurality of energized light elements of a group brought within said series.

* * * * *